US012561114B2

(12) United States Patent
Luschi et al.

(10) Patent No.: US 12,561,114 B2
(45) Date of Patent: Feb. 24, 2026

(54) PARALLEL PROCESSING OF A SOFTMAX OPERATION BY DIVIDING AN INPUT VECTOR INTO A PLURALITY OF FRAGMENTS

(71) Applicant: Graphcore Limited, Bristol (GB)

(72) Inventors: Carlo Luschi, Oxford (GB); Godfrey Da Costa, Bristol (GB); Badreddine Noune, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 590 days.

(21) Appl. No.: 17/335,858

(22) Filed: Jun. 1, 2021

(65) Prior Publication Data

US 2022/0051095 A1     Feb. 17, 2022

(30) Foreign Application Priority Data

Jul. 10, 2020    (GB) ...................................... 2010681

(51) Int. Cl.
*G06F 7/556* (2006.01)
*G06F 7/22* (2006.01)
*G06N 3/048* (2023.01)

(52) U.S. Cl.
CPC ................ *G06F 7/556* (2013.01); *G06F 7/22* (2013.01); *G06N 3/048* (2023.01)

(58) Field of Classification Search
CPC ... G06F 7/556; G06F 7/4833; G06F 7/38–575
See application file for complete search history.

(56) References Cited

U.S. PATENT DOCUMENTS

| | | | | |
|---|---|---|---|---|
| 10,217,346 | B1 * | 2/2019 | Zhang | G01S 5/0278 |
| 12,112,175 | B1 * | 10/2024 | Hanebutte | G06F 17/16 |
| 2020/0184637 | A1 * | 6/2020 | El-Zehiry | G03H 1/0005 |
| 2020/0202846 | A1 * | 6/2020 | Bapna | G06N 3/044 |

(Continued)

OTHER PUBLICATIONS

Hennessy, John L., et al. Computer Architecture: A Quantitative Approach, 2003, Elsevier Science & Technology, 3rd Edition, pp. 609-611. Retrieved from ProQuest Ebook Central (2014). (Year: 2014).*

(Continued)

*Primary Examiner* — Carlo Waje
(74) *Attorney, Agent, or Firm* — HAYNES AND BOONE, LLP

(57) ABSTRACT

A computer comprising a plurality of processing units, each processing unit having an execution unit and access to computer memory which stores code executable by the execution unit and input values of an input vector to be processed by the code, the code, when executed, configured to access the computer memory to obtain multiple pairs of input values of the input vector, determine a maximum or corrected maximum input value of each pair as a maximum result element, determine and store in a computer memory a maximum or corrected maximum result of each pair of maximum result elements as an approximation to the natural log of the sum of the exponents of the input values and access the computer memory to obtain each input value and apply it to the maximum or corrected maximum result to generate each output value of a Softmax output vector.

6 Claims, 8 Drawing Sheets

(56) References Cited

U.S. PATENT DOCUMENTS

| 2021/0271847 | A1* | 9/2021 | Courtiol | ............... | G06T 7/11 |
| 2021/0374502 | A1* | 12/2021 | Roth | ............... | G06N 3/08 |
| 2022/0180467 | A1* | 6/2022 | Koker | ............... | G06F 7/588 |

OTHER PUBLICATIONS

P. Blanchard, D. J. Higham, and N. J. Higham, 'Accurate Computation of the Log-Sum-Exp and Softmax Functions', arXiv, 2019. (Year: 2019).*

P. Blanchard, D. J. Higham, and N. J. Higham, logsumexp-softmax-tests, 2019. Retrieved from https://github.com/higham/logsumexp-softmax-tests. (Year: 2019).*

N.a., Definition of MATLAB's log(x), 2019, MathWorks. Snapshot from WayBack Machine on Feb. 21, 2019. (Year: 2019).*

P. Robertson, E. Villebrun and p. Hoeher, "A comparison of optimal and sub-optimal MAP decoding algorithms operating in the log domain," Proceedings IEEE International Conference on Communications ICC '95, Seattle, WA, USA, 1995, pp. 1009-1013 vol. 2. ( Year: 1995).*

M. Kotlan, "Maximum Value Algorithm Variants Using Parallel Reduction," Feb. 23, 2020, Released on GitHub. (Year: 2020).*

M. Harris, S. Sengupta, and J. Owens, "GPU Gems 3—Chapter 39," Snapshot from WayBack Machine on Dec. 27, 2019, NVIDIA Developer. (Year: 2019).*

I. Kouretas and V. Paliouras, "Simplified Hardware Implementation of the Softmax Activation Function," 2019 8th International Conference on Modern Circuits and Systems Technologies (MOCAST), Thessaloniki, Greece, 2019, pp. 1-4. (Year: 2019).*

Cook (S. Cook, 'Chapter 6—Memory Handling with CUDA', in CUDA Programming, S. Cook, Ed. Boston: Morgan Kaufmann, 2013, (Year: 2013).*

Hennessy et al., "Computer Organization and Design: The Hardware/ Software Interface", Fifth Edition, Chapter 2.2 and 6.3 pp. 63-66 and 509-515, 2014. Retrieved from <https://ict.iitk.ac.in/wp-content/uploads/CS422-Computer-Architecture-ComputerOrganizationAndDesign5thEdition2014.pdf> (Year: 2014).*

Combined Search and Examination Report dated Dec. 8, 2020 for United Kingdom Patent Application No. GB201068.1. 10 pages.

* cited by examiner

Receive/Obtain input values

Pairing the values

Selecting/passing the max* value of each pair, or its approximation given by the max value of each pair (and selecting/passing the remaining value where the number of values is odd)

Is the number of selected values more than 1

Yes (selected values >1)

No (selected values =1)

Output selected value

701

703

705

707

709

PARALLEL PROCESSING OF A SOFTMAX OPERATION BY DIVIDING AN INPUT VECTOR INTO A PLURALITY OF FRAGMENTS

CROSS-REFERENCE TO RELATED APPLICATIONS

The present application claims priority to United Kingdom Patent Application No. 2010681.1, filed on Jul. 10, 2020, the disclosure of which is hereby incorporated by reference herein in its entirety.

FIELD

The present application relates to machine learning computers. The disclosure relates to apparatus and methods for implementing a Softmax activation function, particularly but not exclusively for implementing a Softmax activation function within a machine learning/artificial intelligence computer.

BACKGROUND

Machine learning computers are being constantly improved. They need to address issues of handling vast quantities of data in the form of large vectors or tensors (arrays of input or output values) and to be able to efficiently carry out computational operations on such data at high speeds. These issues are often addressed by introducing parallelism.

Parallelism in computing takes different forms. Program fragments may be organised to execute concurrently (where they overlap in time but may share execution resources) or in parallel where they execute on different resources possibly at the same time.

Parallelism in computing can be achieved in a number of ways, such as by means of an array of multiple interconnected processor tiles, or a multi-threaded processing unit, or indeed a multi-tile array in which each tile comprises a multi-threaded processing unit.

FIG. 1a illustrates an example application of parallelism in the form of machine intelligence. As will be familiar to a person skilled in the art of machine intelligence, machine intelligence begins with a learning stage where the machine intelligence algorithm learns a knowledge model. The model may be represented as a graph 60 of interconnected nodes 102 and links 104. Nodes and links may be referred to as vertices and edges. Each node 102 in the graph has one or more input edges and one or more output edges, wherein some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Each edge 104 communicates a value commonly in the form of a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. These results are sometimes referred to as activations. Each function is parameterized by one or more respective parameters (sometimes referred to as weights, though they need not necessarily be multiplicative weights). In general the functions represented by the different nodes 102 may be different forms of function and/or may be parameterized by different parameters.

FIG. 1(b) furthermore provides a simplified representation of an example node 102. Each node 102 represents a function of its inputs. Some nodes receive the inputs to the graph and some receive inputs from one or more other nodes. The output of some nodes form the inputs of other nodes, and the output of some nodes provide the output of the graph, and the inputs to the graph provide the inputs to some nodes.

Further, the function at each node is parameterized by one or more respective parameters, e.g. weights applied by a weighting function generator 151 and an activation function applied by an activation function generator 153.

The activation function generator 153 is configured to receive weighted input values and generate an output value based on the activation function. The activation function is attached to each node in the network and determines whether it should be activated ("fired") or not, based on whether each node's input is relevant for the model's prediction. Certain activation functions, such as sigmoid or tanh, also help normalize the output of each node to a range, for example between 1 and 0 or between −1 and 1. Other activation functions, such as ReLU, do not normalize the output. Some form of normalisation may be added before or after the activation function in order to generate an output distribution with zero mean and unit variance.

The implementation of each node will therefore involve the processing of data, and the interconnections of the graph correspond to data to be exchanged between the nodes. Typically, at least some of the processing of each node can be carried out independently of some or all others of the nodes in the graph, and therefore large graphs expose opportunities for huge parallelism.

An aspect of activation functions is that they must be computationally efficient because they are calculated across thousands or even millions of nodes for each data sample.

An example of an activation function is the Softmax function. The Softmax function takes a vector input and outputs a normalised vector of values between 0 and 1, making it useful in machine learning problems that require a probability distribution over multiple possible options, such as multi-class classification. The word 'vector' is used herein to denote a matrix of values and encompasses other forms of matrices, such as tensors. In the example of classification into K classes, given a vector of values $x=\{x_1, x_2, \ldots, x_K\}$ representing the score of a given input of belonging to each class, where $x_j>x_i$ for a given i, j indicates that the input is more likely to belong to class j than class i, x can be converted to a probability vector $p=\{p1, p2, \ldots pK\}$ by applying the Softmax function:

$$p_i = \frac{e^{x_i}}{\sum_{j=1}^{K} e^{x_j}}$$

The output of a neural network applied to a multi-class classification task is often determined at the last level by a Softmax function. The Softmax function may also be used to implement an attention mechanism, a common modification applied to neural network models with an encoder-decoder architecture.

Therefore, when running machine learning models on a computer system, the Softmax function needs to be computed, often for very large vectors, and efficient computation of the Softmax function can improve the performance of machine learning models.

SUMMARY

However, the present disclosure recognizes an issue with the Softmax activation function. The efficiency of a given computation such as the Softmax activation function computation depends on a number of factors, one of which is the amount of data that needs to be read from or written to memory. When accessing local memory, for example with respect to multi-tile and associated dedicated memory architectures, or processors or processor cores with dedicated cache memory access, these operations may be relatively fast. However, accesses between processing units such as tiles (or generally to off-core or off-chip memory) may take significantly longer. Thus, minimising the number of required accesses between tiles or to off-chip memory is desired for more efficient computation.

A further potential issue in computing the Softmax function value and specifically, as discussed herein, the calculation of the Softmax denominator term (which comprises a sum of an exponential of the input vector values,) is the risk of memory overflow in the case that the maximum value of the input vector, which may be defined as $x_{max}$, is sufficiently large. This is described in further detail hereafter.

Floating-point representation is often used to approximately represent real numbers. The floating-point representation comprises 3 separate components, i.e. a sign component, a mantissa component, and an exponent component. In the IEEE Standard for Floating Point Arithmetic (IEEE 754), a single-precision (i.e. 32-bit) floating point representation (FP 32) and a half-precision (i.e 16 bit) floating point representation (FP 16) are defined. In the IEEE 754 single precision representation, the sign component consists of a single bit, the exponent consists of 8 bits, and the mantissa consists of 23 bits. In the IEEE 754 half-precision floating-point representation, the sign component consists of a single bit, the mantissa consists of 10 bits, and the exponent consists of 5 bits. In most cases, a number is given from these 3 components by the following formula:

$$(-1)^{sign} \times 1 \cdot mantissa \times 2^{exponent-offset}$$

The displayed "offset" to the exponent is dependent upon the number of bits used to represent the exponent, which depends on the specific floating-point representation. In the single-precision representation, the offset is equal to 127. In the half-precision format, the offset is equal to 15.

Here "1" is an implicit bit, which is derived from the exponent. In the case that the exponent bit sequence consists of anything other than all zeros or all ones, the implicit bit is equal to one and the number is known as a "Norm". In this case, the floating point number is given by:

$$(-1)^{sign} \times 1 \cdot mantissa \times 2^{exponent-offset}$$

In the case that the exponent bit sequence consists of all zeros, the implicit bit is equal to zero and the number is known as a "Denorm". In this case, the floating point number is given by:

$$(-1)^{sign} \times 0 \cdot mantissa \times 2^{exponent-offset}$$

The Denorms are useful, since they allow smaller numbers to be represented than would otherwise be representable by the limited number of exponent bits.

The IEEE representations are given by way of example only, the techniques described herein may be applied to other numerical representations.

An overflow error, a term of the art in computing science, occurs when a number or combination of numbers exceed the maximum value that can be represented in a chosen numeric representation. The result of an overflow error may return the maximum value that can be stored, an Inf or a NAN. For example half-precision floating point representation (FP16) is able to represent a maximum value (ignoring the sign bit) of $2^{15} \times 1.1111111111_2$ or 65504. A non normalised vector value of x which is more than 11 would cause an overflow error for $e^x$. Single-precision floating point representation (FP32) is able to represent a maximum value (ignoring the sign bit) of $2^{127} \times 1.11111111111111111111111_2$ or $3.4028234664 \times 10^{38}$. This allows a non normalised vector value of x to be slightly more than 88 before an overflow error occurs in the $e^x$ value.

Furthermore the use of floating point representations may produce representation errors such as roundoff errors within a calculation such as the Softmax function. A roundoff error or rounding error is the difference between the result produced by a given algorithm using exact arithmetic and the result produced by the same algorithm using finite-precision, rounded arithmetic. Rounding errors are due to inexactness in the representation of real numbers and the arithmetic operations done with them and are a form of quantization error.

For example in FP16 with 10 bits assigned to the fraction the resolution or fixed interval for decimal values between 1 and 2 may be $2^{-10}$ but between 1024 and 2048 is only $2^0$. Furthermore any errors, for example, generated during the calculation of the exponential values may then furthermore be propagated during the summation of the exponential values.

As a floating point addition operation typically comprises lining up the decimal points of the two numbers to be added, adding them, and then storing the result again as a floating-point number, an addition can be subject to roundoff errors. Although the sum itself can be done in higher precision the result is rounded back to the specified precision, which may lead to roundoff error.

In other words roundoff error can be introduced when doing the addition of a large number and a small number because the shifting of decimal points in the mantissas to make the exponents match may cause the loss of some digits.

Increasing the precision of the floating point representation generally reduces the amount of accumulated round-off error caused by intermediate calculations. However, when determining a sum of the exponentials using floating point representations (for example using FP16 rather than FP32 in order to reduce memory transfers as two FP16 values may be transferred using the bandwidth of a single FP32 value) can cause overflow errors. Additionally where the sum of the exponentials is determined (and values are combined) floating point representation imprecision can cause lower magnitude values to be overwhelmed by higher magnitude values and thus lose any effect in the consequent algorithms.

One method to overcome these overflow issues is to determine the maximum value of the input vector before calculating the Softmax values pi, and to subtract this maximum from the exponent as follows:

$$p_i = \frac{e^{x_i - x_{max}}}{\sum_{k=1}^{N} e^{x_k - x_{max}}}$$

This means that the maximum exponent is 0. Using values that are less than 0 makes it impossible for a single exponential to be able to exceed the dynamic range, and reduces the magnitude of the accumulated value of N exponentials.

When attempting to compute the Softmax function in a practical computing environment using the above arithmetical representation, two difficulties are manifest.

In order to determine each value of the Softmax result $p_i$, as a first step the sum of exponentials in the denominator has to be computed and stored. To compute this denominator value, the $x_{max}$ value for the entire vector is required. If the vector is being processed in individual fragments, which can be desirable in order to process a large vector in parallel steps, nevertheless the $x_{max}$ value for the entire vector needs to be determined first. Using this, it is then possible to start computing the denominator. The denominator is required by each individual computing step to calculate each pi value. These computing steps may be operating in parallel in different processing threads or even different processing units. Correspondingly, the $x_{max}$ value for the entire vector, once determined, is supplied to each of the computing processes. For example, the computed denominator value and the determined $x_{max}$ value may be stored in memory accessible by the multiple computing processes. When multiple computing processes have access to a single shared memory, this requires storage of these values in only one location, accessible by each of the computing processes. However, in a context where each computing process has access only to its local memory, this requires multiple duplicate storage, which is inefficient in terms of memory resource.

In order to determine the numerator value, for each Softmax value $p_i$, an access to memory is required to recall the vector value $x_i$ and the $x_{max}$ value. A functional operation is required to implement the exponential operation and return that result to memory. Then a memory access is required to recall the stored denominator value from memory and divide the numerator value by that stored denominator value. These steps are carried out for each Softmax value.

The present disclosure provides a computational method for implementing the Softmax activation function which addresses these above issues in some embodiments. It enables an implementation where each computing process may have access only to its local memory in a massively parallel environment. Furthermore, it enables a large vector to be divided into fragments, the fragments being processed in parallel by respective computing processes with greater efficiency.

However, this method requires the computer to make a memory access to the input vector in order to determine the maximum value of the vector before computing the Softmax values, which requires further accesses to memory to compute the denominator and numerator.

It is disclosed herein that an alternative or additional approach could be beneficial in order to mitigate this issue.

According to one aspect disclosed herein, there is provided a computer-implemented method of processing an input vector comprising a plurality of values, the method comprising:

accessing computer memory to obtain input values from the input vector;

computing, using a processor, an activation function of the input vector to generate an output vector, the output vector comprising one or more output values, wherein the computing an activation function of the input vector to generate an output vector comprises:

(i) determining a natural logarithm of the sum of the exponential of each of the input values; and (ii) determining each output value for the output vector based on the natural logarithm of the sum of the exponential of each of the input values subtracted from a respective input value.

Determining each output value for the output vector may be carried out in some embodiments by:

obtaining the natural logarithm of the sum of the exponential of each of the input values;

subtracting the natural logarithm of the sum of the exponential of each of the input values from the respective input value to generate a value based on the natural logarithm of the activation function; and exponentiating the value based on the natural logarithm of the activation function to generate the output value.

In other embodiments, exponentiating the value may not be needed for a result. In such embodiments, determining each output value comprises:

obtaining a natural logarithm of the sum of the exponential of each of the input values;

subtracting the natural logarithm of the sum of the exponential of each of the input values from the respective input to generate a value based on the natural logarithm of the activation function to generate the output value.

In some embodiments, determining a natural logarithm of the sum of the exponential of each of the input values comprises determining an approximation of the natural logarithm of the sum of the exponential of each of the input values by Iteratively, until there is only one input value remaining, pairing input values and then selecting from each pair of input values the largest value (max), wherein the remaining one input value is determined to be the approximation of the natural logarithm of the sum of the exponential of each of the input values.

In other embodiments, determining a natural logarithm of the sum of the exponential of each of the input values comprises determining an approximation of the natural logarithm of the sum of the exponential of each of the input values by Iteratively, selecting from each pair of input values the largest value, applying a correction factor to the largest value based on the pair of input values to generate a max* result value until there remains one max* result value which is determined to be the approximation of the natural logarithm of the sum of the exponential of each of the input values.

In either of the above methods, that is whether max or max* is used for each pair, where there is an odd number of values they may be padded with a null value to create an even number of input values to create pairs.

In other embodiments, determining a natural logarithm of the sum of the exponential of each of the input values comprises determining an approximation of the natural logarithm of the sum of the exponential of each of the input values by selecting from the input values the largest value, wherein the largest value is determined to be the approximation of the natural logarithm of the sum of the exponential of each of the input values;

An input vector may be obtained by receiving a first input array comprising a plurality of first input values; and applying one or more adjustable weightings to a respective one or more of the first input values to generate the input vector.

Another aspect of the disclosure provides a computer program embodied on computer-readable storage, the program comprising code configured so as when run on one or more processors to perform any of the above defined operations.

Another aspect of the disclosure provides a computer system comprising:

storage comprising one or more memory units, and processing apparatus comprising one or more processing units;

wherein the storage stores code arranged to run on the processing apparatus, the code being configured so as when thus run to perform any of the above defined operations.

Another aspect of the disclosure provides a computer comprising:

a plurality of processing units, each processing unit having an execution unit and access to computer memory which stores code executable by the execution unit and input values of an input vector to be processed by the code, the code, when executed, configured to:

access the computer memory to obtain multiple pairs of input values of the input vector;

determine a maximum or corrected maximum input value of each pair as a maximum result element;

determine and store in a computer memory a maximum or corrected maximum result of each pair of maximum result elements as an approximation to the natural log of the sum of the exponents of the input values; and access the computer memory to obtain each input value and apply it to the maximum or corrected maximum result to generate each output value of a Softmax output vector.

The corrected maximum value may be determined as $$\max(x,y)+\log(1+e^{-|x-y|})$$

where x, y are input values.

In some embodiments, each processing unit is associated with and has access to its own memory which is not shared by others of the processing units.

Each memory may store a set of input values of the input vector constituting a fragment of that input vector.

In some embodiments, each processing unit may be configured to process the fragment of the vector in its associated memory and to generate a maximum result for that fragment, each processing unit configured to share its maximum result with other processing units which are configured to process other fragments of the input vector.

In other embodiments, each processing unit may be configured to process the fragment of the vector in its associated memory and to generate a corrected maximum result for that fragment, each processing unit configured to share its corrected maximum result with other processing units which are configured to process other fragments of the input vector.

Another aspect of the disclosure provides an apparatus comprising a plurality of processor units with each of the plurality of processor units associated with a memory, and including a computer program code, wherein each of the plurality of processor units and associated memories and the computer program code are configured to:

obtain an input vector, the input vector comprising a plurality of input values;

apply an activation function to the input vector to generate an output vector, the output vector comprising one or more output values, wherein the application of the activation function to the input vector to generate an output vector causes the apparatus to:

determine a natural logarithm of the sum of the exponential of each of the input values; and determine an output value for the output vector based on the natural logarithm of the sum of the exponential of each of the input values subtracted from a respective input value.

The system and methods described herein enable a vector (or tensor) to be divided into fragments for processing by respective processing units or processing threads in parallel to obtain the max* or max result of each fragment in parallel with other fragments. In some embodiments an exchange step enables the max*/max results of each fragment to be combined at one processing unit/thread.

Each parallel process can start operating on its fragment without knowledge of other fragments, and without having to determine an overall max*/max value for the overall vector. There are no dependencies between fragments that need to be resolved.

Then, each local process can more efficiently use its memory accesses by recalling successive pairs (such as a register size chunk each time), computing the max*/max of those pairs, returning the result to another register and then selecting a next set of pairs.

BRIEF DESCRIPTION OF THE DRAWINGS

To assist understanding of embodiments of the present disclosure and to illustrate how such embodiments may be put into effect, reference is made, my way of example only, to the accompanying drawings in which.

DETAILED DESCRIPTION OF EMBODIMENTS

The following will present an example activation function implementation suitable for neural networks.

First however there are described example systems in which the presently disclosed techniques may be implemented. There is also provided an overview of the principles behind neural networks, based upon which embodiments may be built or expanded.

Figure 2:
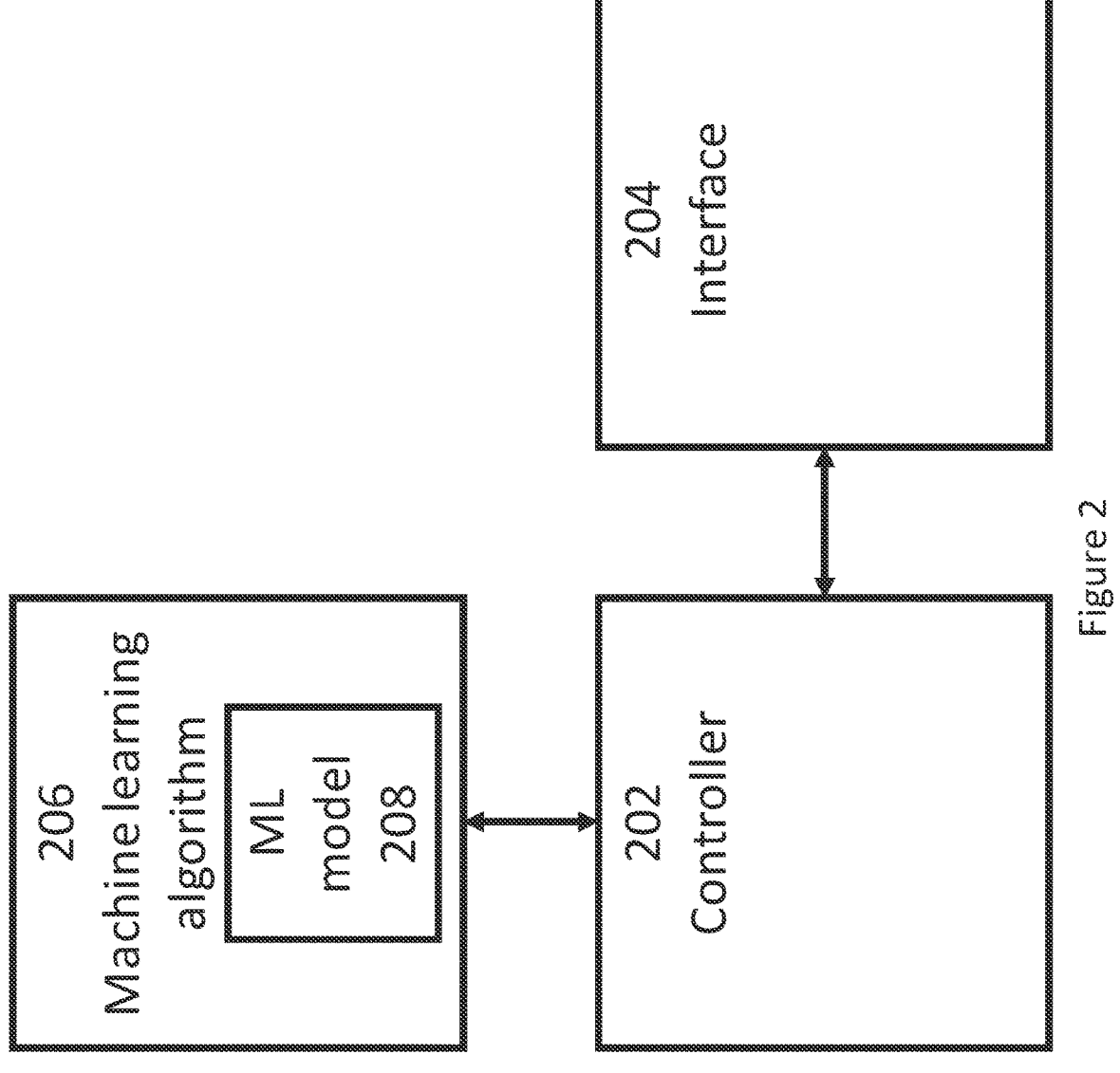
FIG. 2 is a schematic illustration of a computing apparatus for implementing a neural network.

FIG. 2 illustrates an example computing apparatus 200 for implementing an artificial intelligence (AI) algorithm including a machine-learning model in accordance with embodiments described herein. The computing apparatus 200 may take the form of a user terminal such as a desktop computer, laptop computer, tablet, smartphone, wearable smart device such as a smart watch, or an on-board computer of a vehicle such as car, etc. Additionally or alternatively, the computing apparatus 200 may comprise a server. A server herein refers to a logical entity which may comprises one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 200 comprises at least a controller 202, an interface (e.g. a user interface) 204, and an artificial intelligence (AI) algorithm 206. The controller 202 is operatively coupled to each of the interface 204 and the AI algorithm 206.

Each of the controller 202, interface 204 and AI algorithm 206 may be implemented in the form of software code embodied on computer readable storage and run on processing apparatus comprising one or more processors such as CPUs, work accelerator co-processors such as GPUs or IPUs, and/or other application specific processors, implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, one, some or all the controller 202, interface 204 and AI algorithm 206 may be implemented on the server. Alternatively, a respective instance of one, some or all of these components may be implemented in part or even wholly on each of one, some or all of the one or more user terminals. In further examples, the functionality of the above-mentioned components may be split between any combination of the user terminals and the server. Again it is noted that, where required, distributed computing techniques are in themselves known in the art. It is also not excluded that one or more of these components may be implemented in dedicated hardware.

The controller 202 comprises a control function for coordinating the functionality of the interface 204 and the AI algorithm 206. The interface refers to the functionality for receiving and/or outputting data. It may comprise a user interface (UI) for receiving and/or outputting data to and/or from one or more users, respectively. Alternatively the interface may be arranged to collect and/or output data to and/or from an automated function. The interface 204 may additionally or alternatively receive and output data to a different component of the computing apparatus and/or to a different device. The interface 204 may comprise a wired or wireless interface for communicating, via a wired or wireless connection respectively, with an external device. The interface 204 may comprise one or more constituent types of interface, such as voice interface, and/or a graphical user interface. The interface 204 may present a UI front end to the user(s) through one or more I/O modules on their respective user device(s), e.g. speaker and microphone, touch screen, etc., depending on the type of user interface. The logic of the interface may be implemented on a server and output to the user through the I/O module(s) on his/her user device(s).

Alternatively some or all of the logic of the interface 204 may also be implemented on the user device(s) 102 its/themselves.

The controller 202 is configured to control the AI algorithm 206 to perform operations in accordance with the embodiments described herein. It will be understood that any of the operations disclosed herein may be performed by the AI algorithm 206, under control of the controller 202 to collect experience data from the user and/or an automated process via the interface 204, pass it to the AI algorithm 206, receive predictions back from the AI algorithm and output the predictions to the user and/or automated process through the interface 204.

The AI algorithm 206 comprises a machine-learning model 208, comprising one or more constituent statistical models such as one or more neural networks.

As discussed above each of the controller 202, interface 204 and AI algorithm 206 may be implemented in the form of software code embodied on computer readable storage and run on a data processing system comprising one or more processors. In some embodiments the processor comprises a plurality of processor tiles. The data processing system may be a so called intelligence processing unit (IPU) or any class of accelerator (XPU). The techniques described herein can be used with the IPUs described in our earlier U.S. application Ser. No. 15/885,925, the contents of which are herein incorporated by reference.

Figure 3:
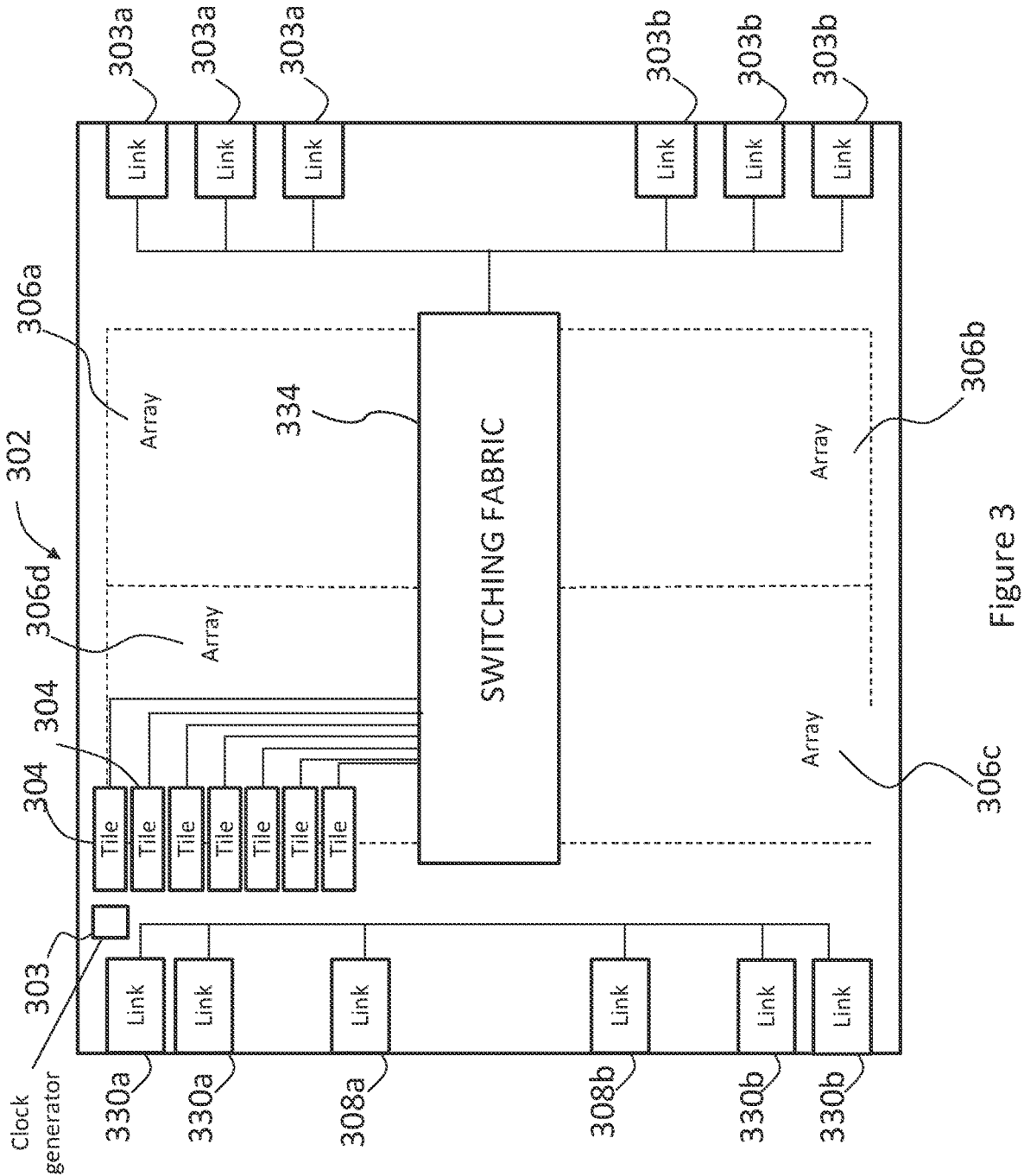
FIG. 3 is a schematic illustration of an example of multi-tile processor suitable for implementing a neural network and for generating an activation function according to some embodiments.

FIG. 3 illustrates schematically an example architecture of a single chip processor 302. The processor is referred to herein as an IPU (Intelligence Processing Unit) to denote its adaptivity to machine intelligence applications. In a computer, the single chip processors can be connected together as discussed later, using links on the chip, to form a computer. The processor 302 comprises multiple processing units referred to as tiles arranged on a single chip. In one embodiment, there are 1216 tiles 304 organised in arrays 306a, 306b, 306c, and 306d. The processor 302 has two chip-to-host links 308a, 308b and 4 chip-to-chip links 330a, 330b arranged on an edge of the chip. The processor 302 receives work from a host (not shown) which is connected to the chip via one of the card-to-host links in the form of input data to be processed by the chip 302. The chips can be connected together into cards by a further chip-to-chip links 303a, 303b. The host may access a computer which is architected as a single chip processor 302 as described herein or a group of multiple interconnected single chip processors 302 depending on the workload from the host application.

When the processor is executing a machine learning or other complex or graph based application, vectors to be processed are provided to the processor from the host as workloads to be processed. Where vectors are small enough, a single vector may be processed by a single respective tile. It is more common for vectors in ML applications to be extremely large. In that case they may be broken up into fragments, and each fragment processed by an individual tile. Results of the processing are provided by each tile and may be combined at the same tile or other tiles, or supplied to the host for combining.

The chip 302 has a clock generator 303 which generates a clock signal from an on or off chip clock to control the timing of chip activity. The clock generator is connected to all of the chip's circuits and components. The chip 302 comprises a switching fabric 334 to which all tiles and links are connected by sets of connection wires to enable communication between tiles on the processor. Each tile has its own local memory (described later). The tiles do not share memory.

Figure 4:
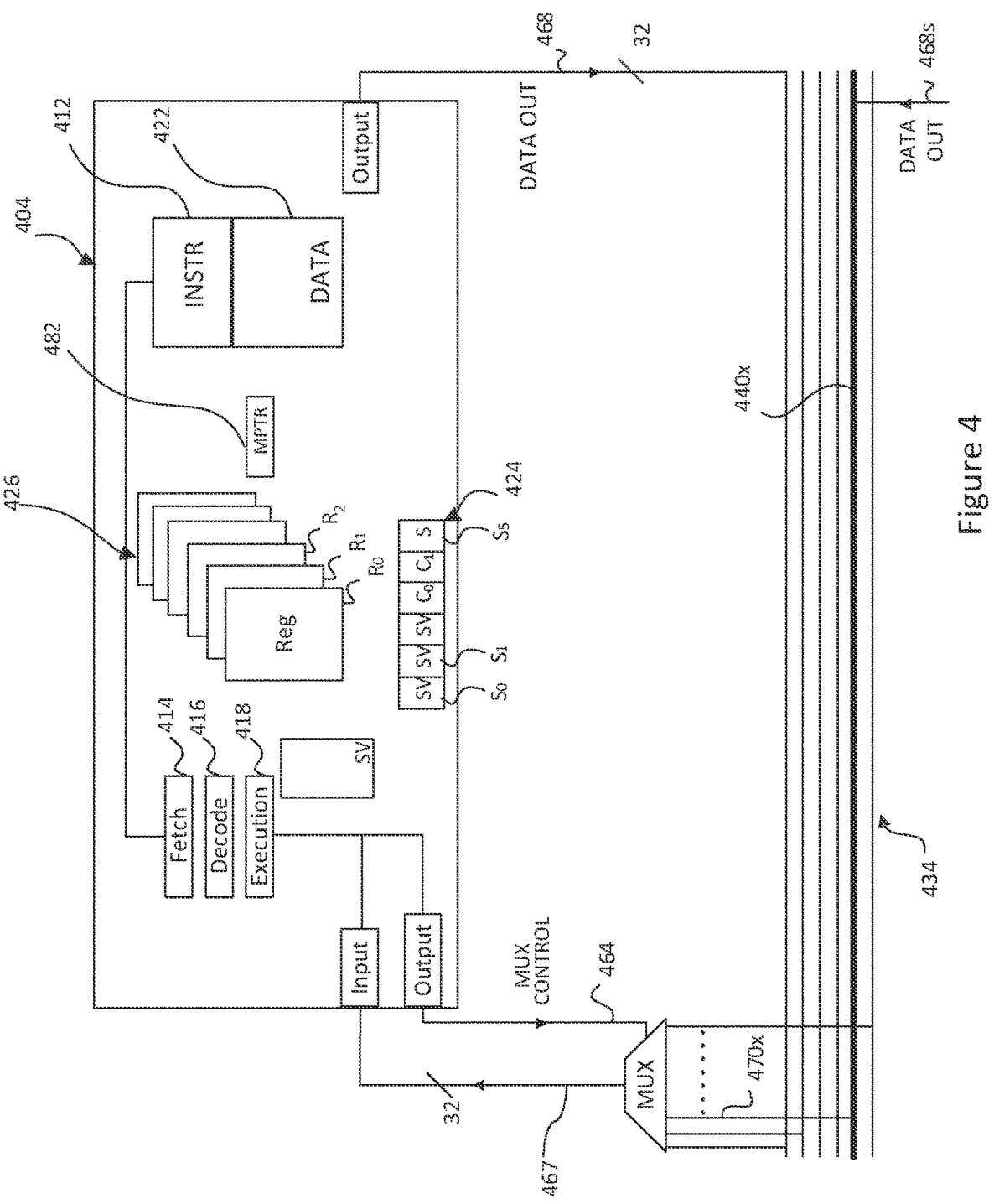
FIG. 4 is a schematic illustration of a single tile from the multi-tile processor shown in FIG. 3 illustrating the input and output signals.

FIG. 4 illustrates an example tile 404 in accordance with embodiments of the present disclosure. In the tile, multiple threads of execution are interleaved through a single execution pipeline. In some embodiments, each thread may process a vector or vector fragment in accordance with pre-compiled instructions stored on the tile in an instruction memory 412. The tile 404 comprises: a plurality of contexts 426 each arranged to represent the state of a different respective one of a plurality of threads; the shared instruction memory 412, which is common to the plurality of threads on that tile, but not shared by other tiles; a shared data memory 422 that is also common to the plurality of threads; a shared execution pipeline 414, 416, 418 that is again common to the plurality of threads; and a thread scheduler 424 for scheduling the plurality of threads for execution through the shared pipeline in an interleaved manner.

The data memory holds data supplied to the tile for processing, for example vector values of a whole vector or fragment of a vector, and results of that processing.

The thread scheduler 424 is schematically represented in the diagram by a sequence of time slots $S_0 \ldots S_5$, but in practice is a hardware mechanism managing program counters of the threads in relation to their time slots. The execution pipeline comprises a fetch stage 414, a decode stage 416, and an execution stage 418 comprising an execution unit (EXU) and a load/store unit (LSU). Each of the contexts 426 comprises a respective set of registers $R_0$, $R_1$ . . . for representing the program state of the respective thread.

The fetch stage 414 is connected to fetch instructions to be executed from the instruction memory 412, under control of the thread scheduler 424. The thread scheduler 424 is configured to control the fetch stage 414 to fetch instructions from the local program for execution in each time slot.

Note that in normal operation the program loaded into each tile is determined by a processor or compiler to allocate work based on the graph of the machine intelligence model being supported. This graph defines what code (executable instructions) is stored and executed on each tile. Data (inputs and outputs) may be exchanged between tiles and or the host.

Each thread may in some embodiments be a codelet intended to represent a vertex in the graph and to execute atomically. That is all the data it consumes is available at launch and all the data it produces is not visible to other threads until it exits. It runs to completion (excepting error conditions).

As briefly mentioned above, data is exchanged between tiles in the chip. In general, there may exist dependencies between the portions of a program running on different tiles. A technique is therefore required to prevent a piece of code on one tile running ahead of data upon which it is dependent being made available by another piece of code on another tile. There are a number of possible schemes for achieving this. One scheme is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase, each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is to say, either. (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile performing computation may be allowed to communicate with other system resources such as a network card or storage disk, as long as no communication with other tiles in the group is involved. As described further herein, results which are exchanged may be from respective fragments of a vector.

As discussed earlier FIG. 1(a) illustrates the principle behind a neural network. A neural network 60 comprises a graph of interconnected nodes 102 and edges connecting between nodes, all implemented in software. Each node 102 has one or more input edges and one or more output edges, with at least some of the nodes 102 having multiple input edges per node, and at least some of the nodes 102 having multiple output edges per node. The input edges of one or more of the nodes 102 form the input to the graph (typically an input vector, i.e. there are multiple input edges). The output edges of one or more of the nodes 102 form the overall output of the graph (which may be an output vector in the case where there are multiple output edges). Further, the output edges of at least some of the nodes 102 form the input edges of at least some others of the nodes 102.

Each node 102 represents a function of the input value(s) received on its input edges(s), the outputs of the function being output on the output edge(s) of the respective node 102, such that the value(s) output on the output edge(s) of the node 102 depend on the respective input value(s) according to the respective function. The function of each node 102 is also parametrized by one or more respective parameters w, sometimes also referred to as weights (not necessarily weights in the sense of multiplicative weights, though that is certainly one possibility). Thus the relation between the values of the input(s) and output(s) of each node 102 depends on the respective function of the node and its respective weight(s).

Figure 1A:
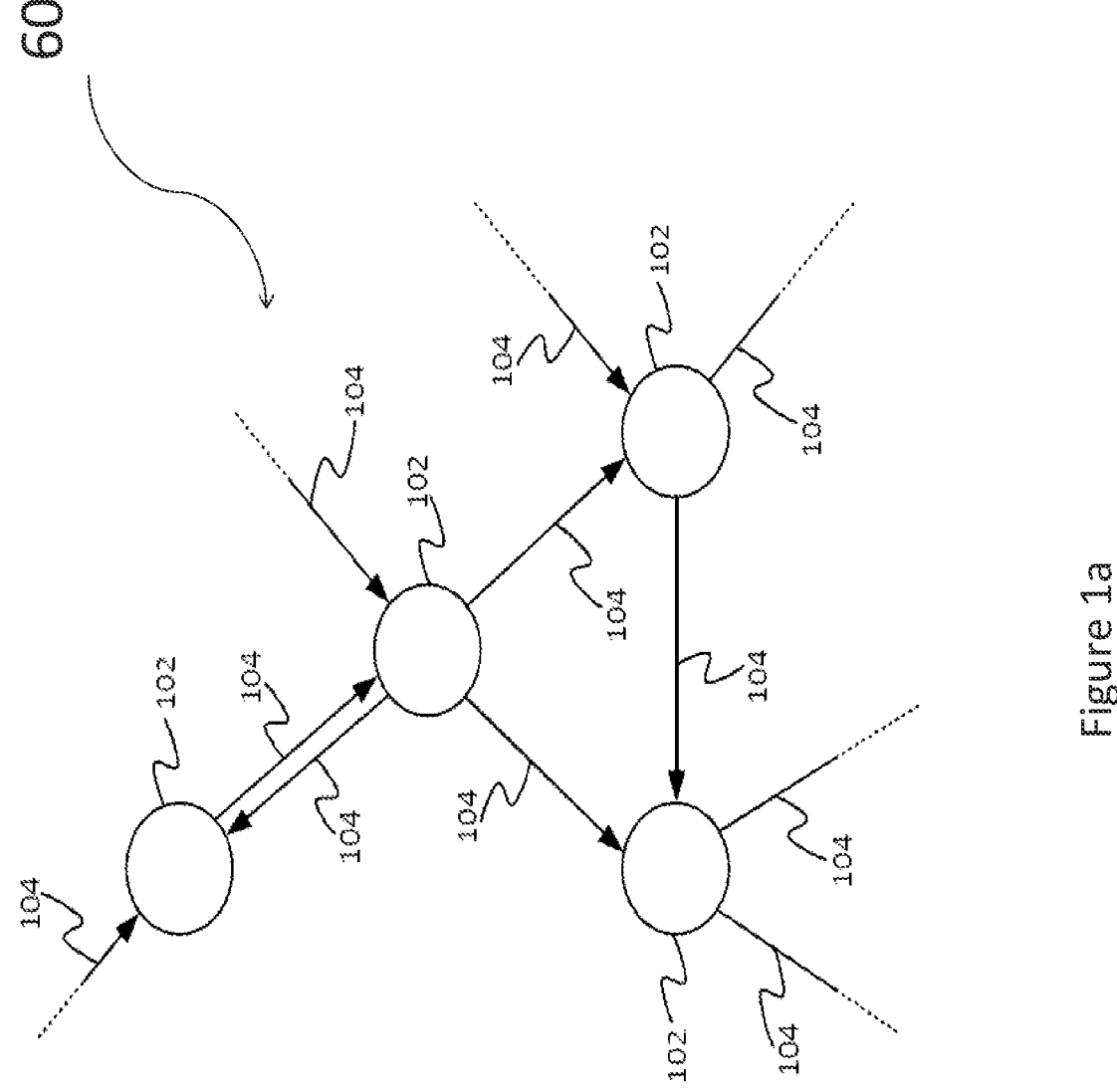
FIG. 1(a) is a schematic illustration of a neural network.
Figure 1B:
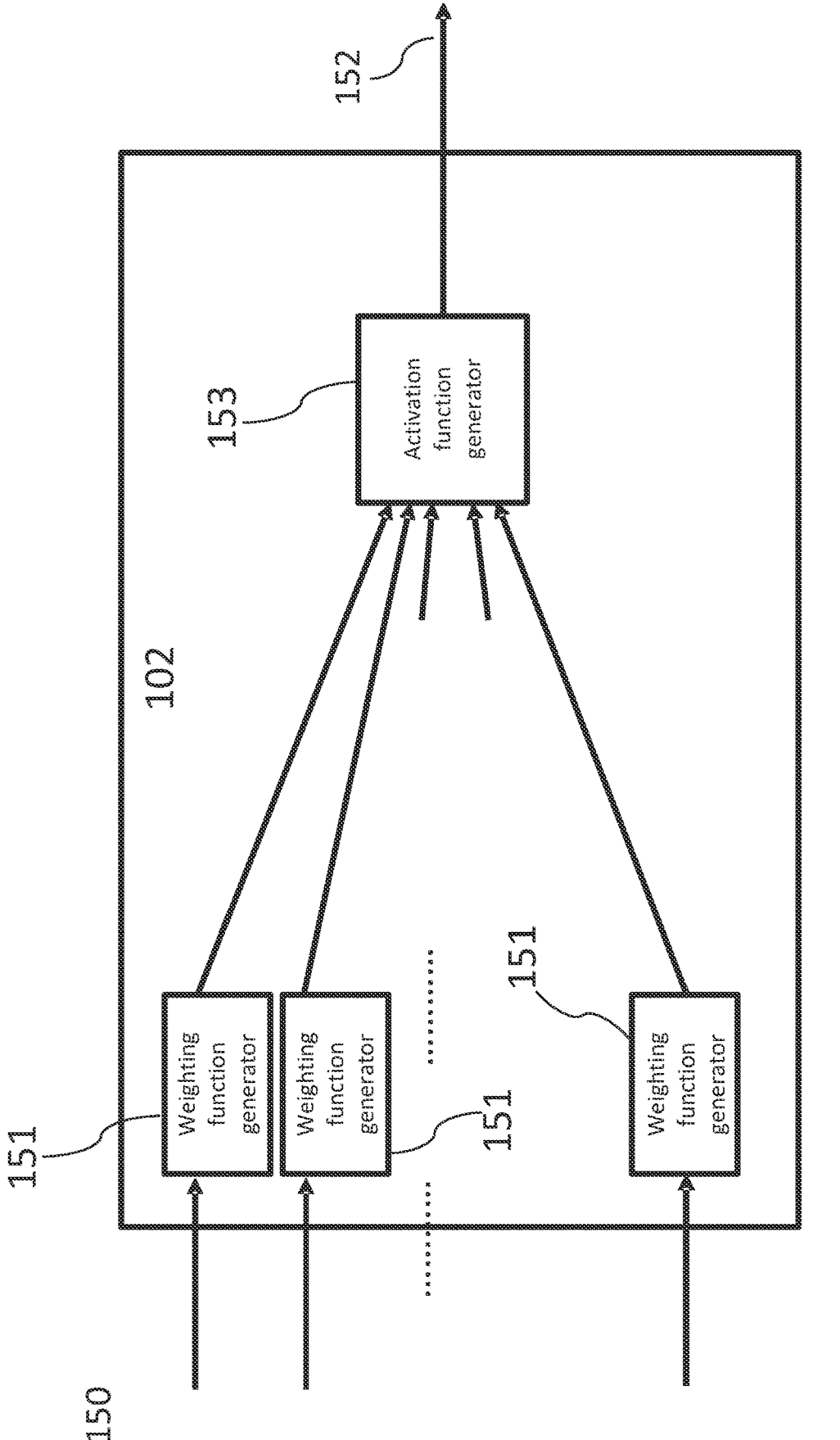
FIG. 1(b) is a schematic illustration of a node within the neural network.

As shown in the example of FIG. 1(a), the nodes 102 of the graph 60 may be arranged into a plurality of layers, each layer comprising one or more nodes 102.

A simple example may be a machine-learning model which comprises a single graph, arranged to take a feature vector X as its input and to output a classification Y as its output. The input feature vector X comprises a plurality of elements $x_i$, each representing a different feature i=0, 1, 2, . . . etc. E.g. in the example of image recognition, each element of the feature vector X may represent a respective pixel value. For instance one element represents the value of the red channel for pixel (0,0); another element represents the value of the green channel for pixel (0,0); another element represents the blue channel of pixel (0,0); another element represents the red channel of pixel (0,1); and so forth. As another example, where the neural network is used to make a medical diagnosis, each of the elements of the feature vector may represent a value of a different symptom or physical feature of the subject, e.g. body temperature, blood pressure, etc. Other example implementations include natural language processing. It would be understood that the concept as discussed herein is not limited to these applications but could be any suitable application.

As discussed above an example activation function which can be used in the network is the Softmax function. In order to prevent memory overflow when implementing the Softmax function it is known to first determine the maximum value of the input vector before calculating the Softmax value and to subtract the maximum from each value before taking the exponent, such that the maximum value becomes 0 and the exponent of the maximum value is 1 and there is no risk of overflow.

Furthermore as also discussed this implementation requires the computer to make a series of memory accesses to retrieve the values of the input vector and a series of comparisons between the input vector values to determine the maximum value of the vector. Having determined the maximum value, one needs to compute the denominator. Finally, the Softmax values are then calculated. This calculation requires for each value an access to get the exponent of the numerator, and a second access to get the previously computed denominator.

The present systems and methods, as discussed in more detail in the embodiments hereafter, are such that the computation of the Softmax function is implemented in such a manner that there is reduction in memory access. Additionally when implementing the embodiments as described herein there may generally be a reduction of dependencies within a massive parallel compute.

Figure 5:
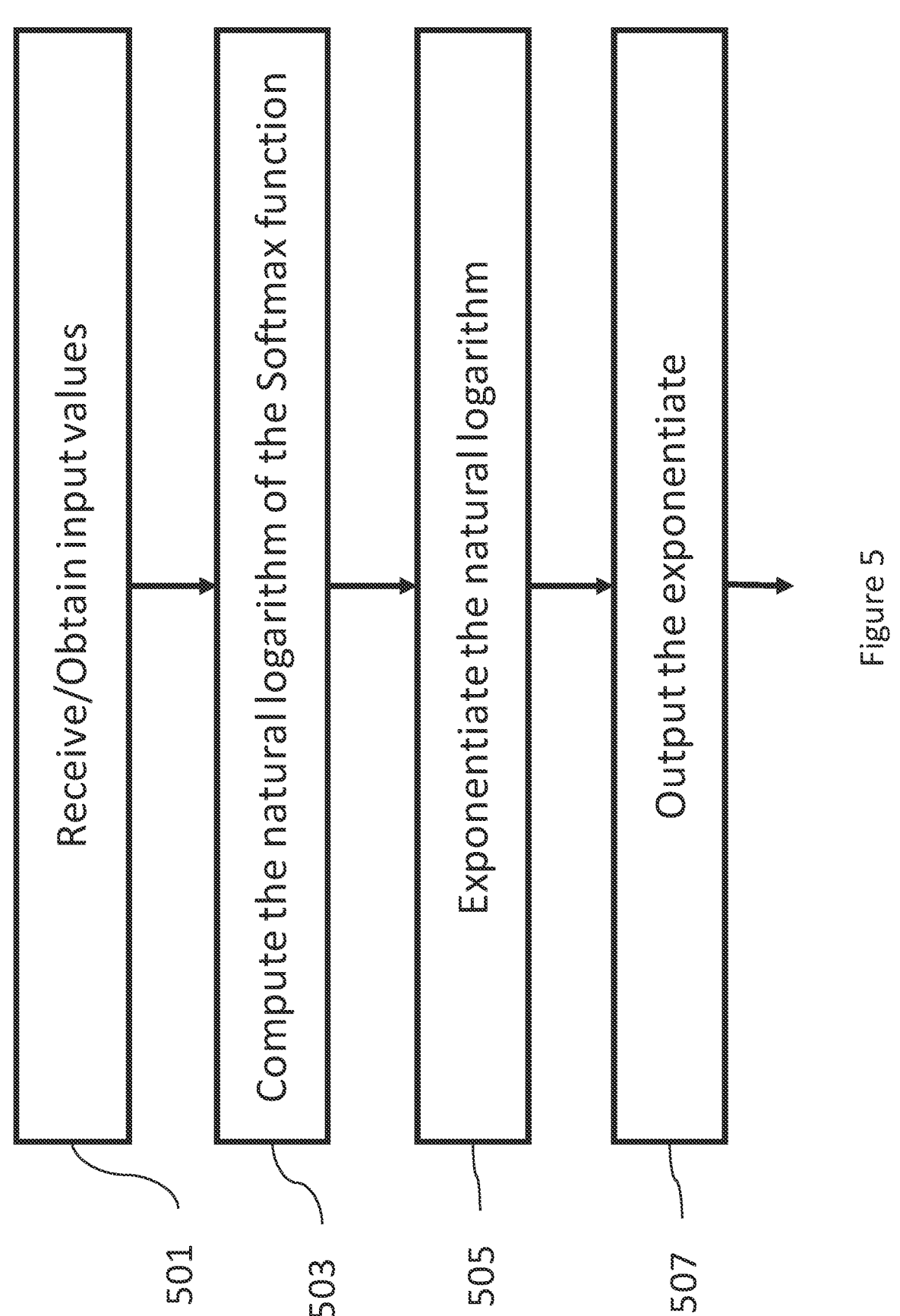
FIG. 5 schematically illustrates a flow diagram of the operations for generating an activation function according to some embodiments.

With respect to FIG. 5 is shown an example method for determining or computing the Softmax value which eliminates the risk of overflow, while reducing memory accesses.

The activation function implementation may first be configured to receive or obtain at step 501 input vectors as a workload from a host and the input vectors stored into tile memory. The input vectors may comprise the input values (or the weighted input values) as shown in FIG. 5.

Note that the technique described herein may be carried out on complete vectors, or on fragments of vectors. The word 'vector' in the following encompasses matrices which represent whole vectors or tensors as well as matrices which represent vector or tensor fragments resulting from 'chopping up' a whole vector or tensor. The word 'vector' may be considered to denote a set of input values.

In the following examples the input values are shown as unweighted input values $x_i$ (but it would be understood that weighted input values can be used in some examples and embodiments).

Having obtained the input values $x_i$ for one vector the activation function implementation is configured to determine or compute the natural log of the Softmax value for that vector.

The operation of determining the natural log of the Softmax value is shown in FIG. 5 by step 503.

The calculation of the natural log of the Softmax value eliminates the risk of overflow.

$$\log(p_i) = \log\left(\frac{e^{x_i}}{\sum_{k=1}^{N} e^{x_k}}\right) = \log(e^{x_i}) - \log\left(\sum_{k=1}^{N} e^{x_k}\right) = x_i - \log\left(\sum_{k=1}^{N} e^{x_k}\right).$$

As can be seen in the expression above the calculation of the log of the Softmax value can itself be implemented as two separate terms, a first term $x_i$ and a second term $\log(\sum_{k=1}^{N} e^{x_k})$.

The second term of the above expression can in some embodiments be computed using a method called max* reduction.

The log of a sum of two exponentials can be rewritten as follows:

$$\log(e^x + e^y) = \max(x, y) + \log(1 + e^{-|x-y|})$$

This can be approximated to max(x, y) with the addition of a correction term and will be referred to herein as max*(x, y). The correction term is $$\log(1 + e^{-|x-y|})$$

The max* value is referred to herein as the corrected maximum value. In some cases, the max value may be used without the addition of the correction term. In other words, the reference to max* encompasses it approximation, which is the maximum value of each pair of values, referred to as max.

In some embodiments the expression of max* can be applied recursively to neighbouring pairs of values in a sum in order to calculate the log of a larger sum of exponentials. For example, if there are four terms in the sum:

$$\log(e^w + e^x + e^y + e^z) =$$
$$\log\left(e^{\log(e^w + e^x)} + e^{\log(e^y + e^z)}\right) \approx \max^* (\max^* (w, x), \max^* (y, z)).$$

Thus, it is possible to calculate the log of a sum of exponentials while accessing the input vector in memory only once. In the case that at a given level, the number of values is not divisible by two, any single values are carried to the next level of recursion.

In some embodiments, access can be performed to read successive pairs of values into registers from the memory to be processed by the execution pipeline. Each register could be configured to hold a data chunk representing one or more pairs of values. A chunk is accessed from memory. The execution pipeline performs a max* operation and stores the max* result back to memory, or to a register for a next computation. The next chunk may then be accessed from memory to be processed by the execution pipeline, and the next max* value stored. Where the vector is divided into fragments for processing by respective processing units, such as tiles, each tile may compute the max* value of its fragment. The max* values of the fragments may then be exchanged with other processing units and combined. For example, the max* values of respective fragments may be computed in respective processing units or respective processing threads within a processing unit, in a compute phase of a BSP computing protocol. In an exchange phase of the BSP computing protocol, the max* values may be transmitted to one of the processing units/threads or to an additional processing unit/thread. In a next compute phase, the max* values of the respective fragments may be processed to generate a final max* value for that vector.

Figure 6:
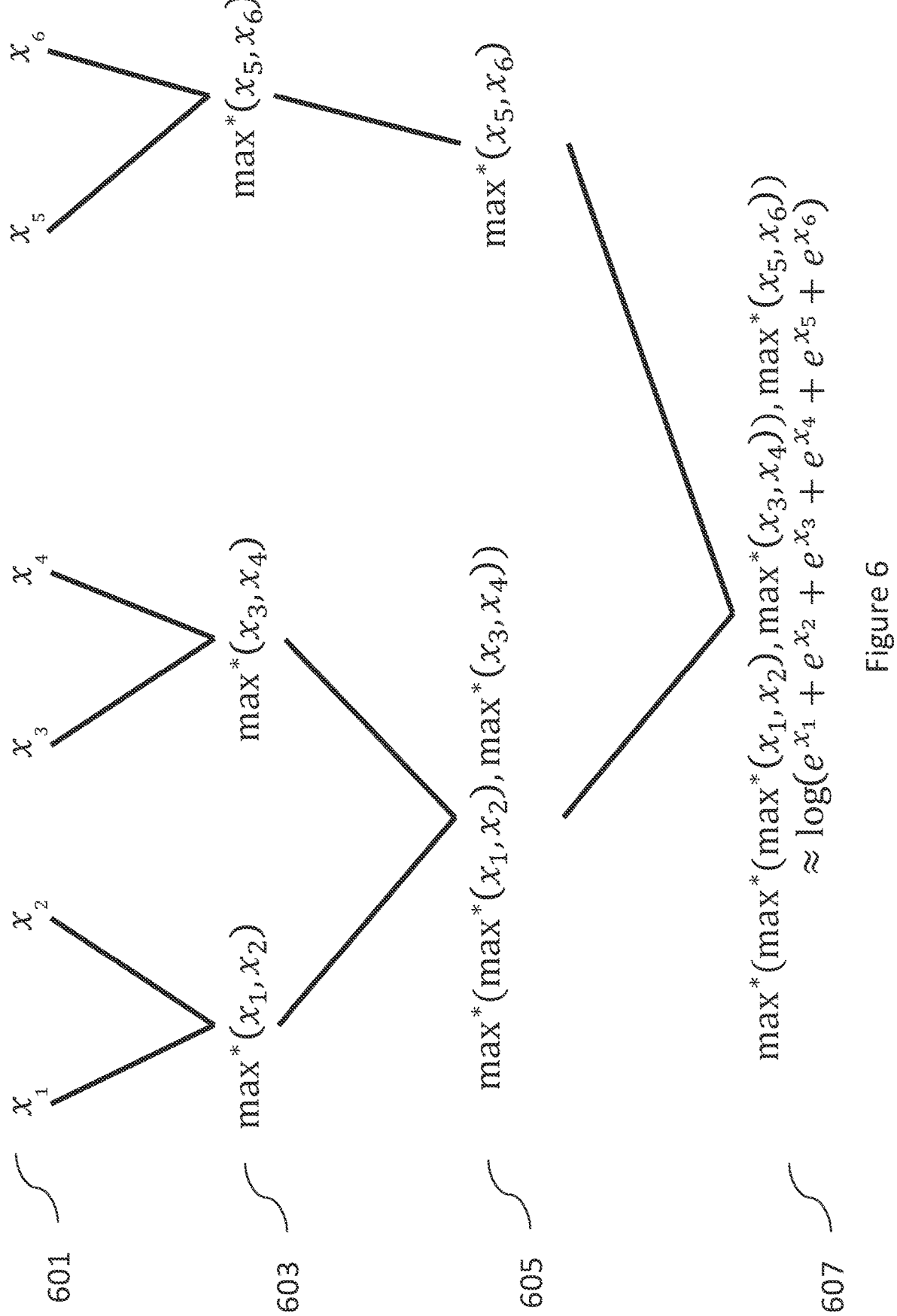
FIG. 6 schematically illustrates the decomposition of the indices for the determination of the activation function according to some embodiments.

FIG. 6 for example shows how the process of calculating the expression max* can be applied recursively to a set of 6 input values, including an odd number of values at a given level.

For example a first level 601 is the level containing the input values $x_i$ for the function.

A second level 603 is a level wherein the input values $x_i$ have been paired and the max* value of each is generated. The second level is shown with an odd number of elements.

A third level 605 is a level where the elements of the second level 603 are paired and the max* value of these pair combinations are calculated. It can be seen that as the second level has an odd number of elements one of these is passed to the next level.

A fourth level 607 is a level where the elements of the third level 605 are paired and the max* value of these pair combination are calculated. In this example this provides a final value which can be used in the Softmax function implementation.

Figure 7:
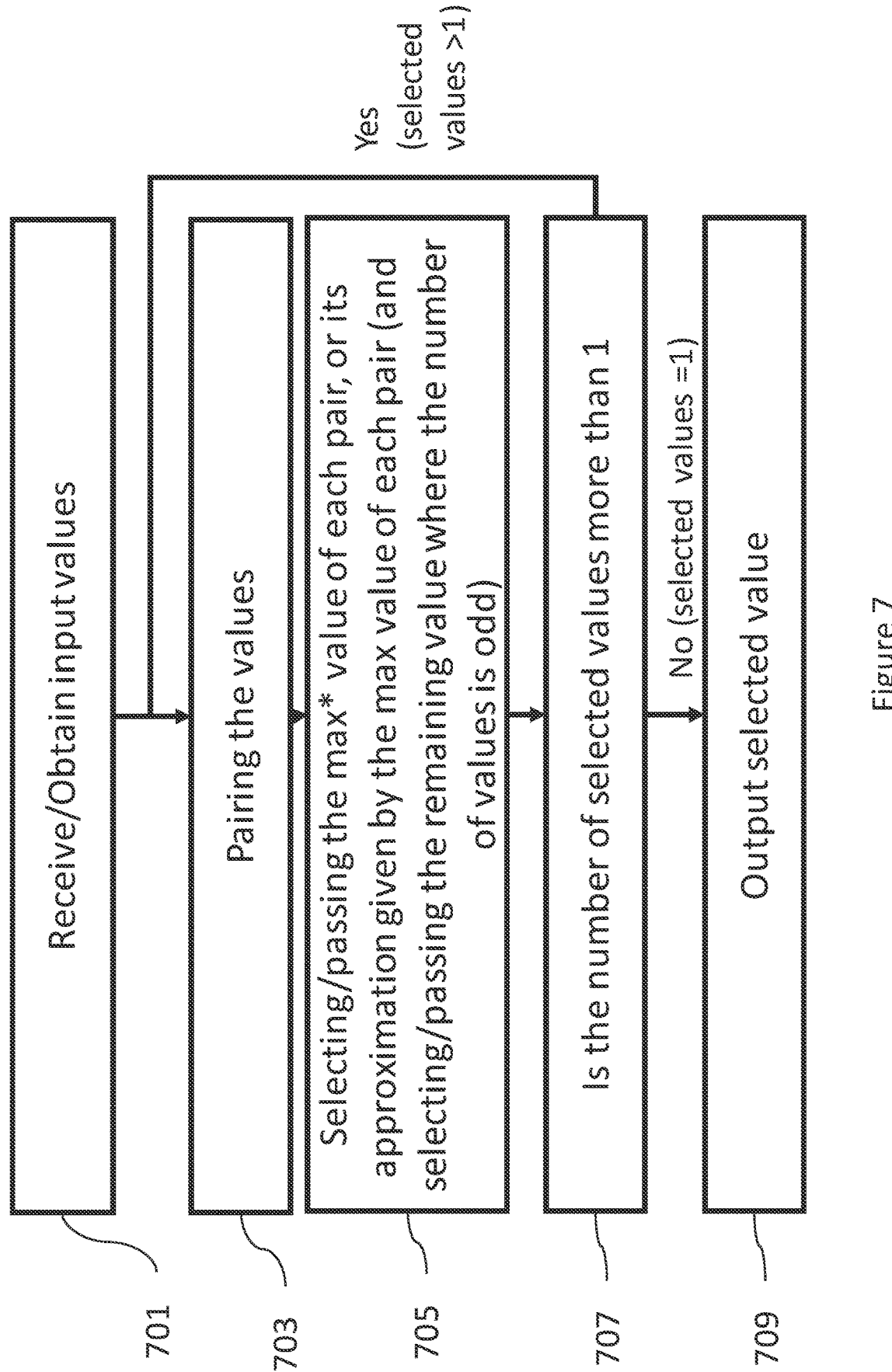
FIG. 7 schematically illustrates a flow diagram of the operations for schematically illustrates a flow diagram of the operations for generating an activation function according to some embodiments.

This pairing iterative method is shown in an example with respect to FIG. 7.

A first operation is receiving/obtaining the input values $x_i$ as shown in FIG. 7 by step 701.

The next operation is pairing the values as shown in FIG. 7 by step 703.

The following operation is from each pair to select or pass the max* value of each pair or its approximation given by the max value of each pair. Where the number of elements was odd, then the operation further passes or selects the unpaired value. The selection or passing operation is shown in FIG. 7 by step 705.

A further check operation may then determine whether the number of selected elements is one or more as shown in FIG. 7 by step 707.

Where there is more than one element remaining then the operation can loop back or iterate to pairing the remaining values as shown by the arrow back to step 703.

Where there is only one element or value remaining then the operation is configured to use the value as an approximation of the log sum of exponential values of the input terms as shown in FIG. 7 by step 709.

To then determine or calculate the Softmax function, the calculated log sum should be subtracted from the given value $x_i$ of the input vector x.

Having determined the natural log of the Softmax value this may be exponentiated to evaluate the Softmax function value. In this case, there is no risk of overflow as the final result is bound to be between 0 and 1 by the definition of the Softmax function. Additionally the combination or sum of the exponential terms is furthermore avoided and any issue of swamping of an input value reduced. The determination of the exponentiate of the natural log of the Softmax value is shown in FIG. 5 by step 505.

There are certain applications in which the Softmax function itself is not needed but the natural logarithm of Softmax is. In such applications the step of exponentiating the result is not carried out, but the log sum is calculated and subtracted from each value in the input vector.

The result of using this method in favour of calculating the max of the input vector and using it to scale the Softmax calculation is that the Softmax of the input may be calculated while making fewer memory accesses to the input vector, which reduces the computational resources required, particularly in the case of very large input vectors, or many Softmax calculations. In addition, the number of operations required to compute the Softmax function is reduced. Each value of the input vector is accessed when calculating the log of the sum of exponentials by recursively applying the max* reduction, and once more when the calculated log sum is subtracted from the vector and the result is exponentiated.

This, for example, may be more efficient than implementing the following five steps: pre-calculating the max of the vector, subtracting the max from each value of the vector, taking the exponential of each value of the vector, summing the exponentials and dividing each exponentiated value of the vector by the sum.

In some embodiments the max* reduction as shown in the examples of FIGS. 6 and 7 could be implemented in hardware, by defining a 'max*' instruction of the processor's instruction set, or it may be alternatively implemented in software. In both cases, the operation of max* requires two inputs a and b and produces an output which approximates to $\log(e^a+e^b)$, which may then be passed as input to another max* operation or, as the next step of the Softmax calculation, subtracted from an input vector and the resulting vector exponentiated.

There may be some additional advantages that when processing is carried out over multiple threads, fewer steps may further improve performance. Thus in a simple example, the max needs to be calculated first, and all threads would be synchronised at that point to then subtract the max from the vector values in parallel, and synchronised again after calculating the sum of exponentials in order for each thread to divide by the sum.

In the embodiments described above, synchronisation can occur when calculating max* for the vector so that each thread could subtract this value from the vector elements and then exponentiate the result. The subtraction and exponentiation can be implemented in parallel for different vector elements once the max* result is known.

This may be particularly advantageous in implementation architectures such as discussed with respect to FIGS. 3 and 4 as once the max* result is determined the tiles within the IPU can operate independently and this results in a significant reduction in data dependency.

It will be appreciated that the above embodiments have been described by way of example only.

For example although the algorithm has been discussed with a massively parallel compute wherein each thread may implement a vertex it would be appreciated that embodiments may be applicable to a pool of threads/processes whether they are implemented in software on a processing unit comprising one or more processing node or a IPU such as described above.

Other variants and applications of the disclosed techniques may become apparent to a skilled person once given the disclosure herein. The scope of the present disclosure is not limited by the described embodiments but only by the accompanying claims.

The invention claimed is:

1. A computer-implemented method of executing a neural network by processing an input vector comprising a plurality of input values, the method implemented in a hardware processor comprising a plurality of processing units on a single chip, each processing unit comprising an execution unit and having access to computer memory, wherein each processing unit is associated with and has access to its own computer memory which is not shared by others of the processing units, wherein the computer memory of each processing unit stores code executable by the execution unit of that processing unit, wherein the input vector is divided into a plurality of fragments, wherein there are no dependencies among any of the plurality of fragments, and wherein each processing unit further comprises a respective plurality of registers, the method comprising:

storing in each computer memory a respective fragment of the input vector;

the execution units operating in parallel wherein each execution unit accesses its own computer memory in a selecting step to obtain input values from its fragment of the input vector; and computing, using the hardware processor, an activation function of the input vector to generate an output vector, the output vector comprising a plurality of output values, wherein the computing the activation function of the input vector to generate the output vector comprises:

each execution unit selecting, in the selecting step, from the input values of its fragment a largest value, wherein the largest value is determined by reading successive pairs of input values of its fragment into the respective plurality of registers and recursively determining a maximum value of pairs of values stored in the registers, wherein the largest value is determined to be an approximation of a natural logarithm of a sum of an exponential of each of the input values;

sharing the largest value from the input values of each fragment with the other processing units and obtaining a maximum result value based on the largest value of all fragments and storing the maximum result value in the computer memory of each processing unit;

the execution units operating in parallel wherein each execution unit accesses its computer memory in a computing step to obtain each input value of its fragment and the maximum result value; and computing each output value for the output vector, wherein computing each output value for the output vector comprises subtracting the maximum result value from each respective input value of the respective fragment to generate a respective output value of the respective fragment based on a natural logarithm of the activation function and combining the respective output values of all the fragments to generate the output vector, wherein the neural network comprises a layer, and wherein the input vector is an input to the layer and the output vector is an output of the layer.

2. The computer-implemented method as claimed in claim 1, wherein computing each output value comprises:

exponentiating the each respective input value.

3. The computer-implemented method as claimed in claim 1, which comprises a compute phase and an exchange phase wherein the execution units operate in parallel in the compute phase and wherein the step of sharing is performed in the exchange phase.

4. A computer program embodied on non-transitory computer-readable storage, the program comprising code configured so as when run on a hardware processor comprising a plurality of processing units on a single chip, each processing unit comprising an execution unit and having access to computer memory, wherein each processing unit is associated with and has access to its own computer memory which is not shared by others of the processing units, wherein the computer memory of each processing unit stores the code executable by the execution unit of that processing unit, wherein an input vector is divided into a plurality of fragments, wherein there are no dependencies among any of the plurality of fragments, and wherein each processing unit further comprises a respective plurality of registers, the hardware processor performs a method of executing a neural network by processing the input vector comprising a plurality of input values by performing operations including:

storing in each computer memory a respective fragment of the input vector;

the execution units operating in parallel wherein each execution unit accesses its own computer memory in a selecting step to obtain input values from its fragment of the input vector;

computing an activation function of the input vector to generate an output vector, the output vector comprising one or more output values, wherein the computing the activation function of the input vector to generate the output vector comprises:

each execution unit selecting, in the selecting step, from the input values of its fragment a largest value, wherein the largest value is determined by reading successive pairs of input values of its fragment into the respective plurality of registers and recursively determining a maximum value of pairs of values stored in the registers, wherein the largest value is determined to be an approximation of a natural logarithm of a sum of an exponential of each of the input values;

sharing the largest value from the input values of each fragment with the other processing units and obtaining a maximum result value based on the largest value of all fragments and storing the maximum result value in the computer memory of each processing unit;

the execution units operating in parallel wherein each execution unit accesses its computer memory in a computing step to obtain each input value of its fragment and the maximum result value; and computing each output value for the output vector, the computing comprising subtracting the maximum result value from each respective input value of the respective fragment to generate a respective output value of the respective fragment based on a natural logarithm of the activation function and combining the respective output values of all the fragments to generate the output vector, wherein the neural network comprises a layer, and wherein the input vector is an input to the layer and the output vector is an output of the layer.

5. A computer configured to execute a neural network comprising a layer, the computer comprising:

a plurality of processing units, each processing unit comprising an execution unit and having access to computer memory, wherein each processing unit is associated with and has access to its own computer memory which is not shared by others of the processing units, wherein the computer memory stores code executable by the execution unit and input values of an input vector to be processed by the code, wherein the input vector is divided into a plurality of fragments, wherein there are no dependencies among any of the plurality of fragments, and wherein each processing unit further comprises a respective plurality of registers, wherein the computer memory of each processing unit stores a set of input values of the input vector constituting a respective fragment of the plurality of fragments, and wherein the code, when executed, is configured to cause the processing units to operate in parallel wherein each processing unit is configured to:

process its fragment by accessing its associated computer memory to obtain multiple pairs of the input values of its fragment of the input vector and reading the multiple pairs into the respective plurality of registers;

recursively determine a maximum or a corrected maximum input value of each pair stored in the registers as a maximum result element of its fragment;

store in the computer memory a maximum or a corrected maximum result of the maximum result element of the multiple pairs as an approximation to a natural log of a sum of exponents of the input values of its fragment, share its maximum or corrected maximum result with other processing units which are configured to process other fragments of the input vector to generate respective other maximum or corrected maximum results, the code configured to cause each processing unit to combine its maximum or corrected maximum result with the respective other maximum or corrected maximum results received from the other processing units to generate a maximum or corrected maximum result of the input vector; and access its computer memory to obtain each input value of its fragment and apply each input value to the maximum or the corrected maximum result of the input vector to generate each output value of an output fragment of a Softmax output vector, wherein the input vector is an input to the layer of the neural network, and wherein the output vector comprises the output fragments and is an output of the layer.

6. The computer as claimed in claim 5 wherein the corrected maximum result is determined as $$\max(x,y)+\log(1+e^{-|x-y|})$$

where x, y are the input values.

* * * * *